United States Patent [19]

Hawk

[11] Patent Number: 4,541,661
[45] Date of Patent: Sep. 17, 1985

[54] TRUCK BUMPER AND STEP DEVICE

[75] Inventor: Theodore L. Hawk, Rochester, Ohio

[73] Assignee: Park Poultry, Inc., Canton, Ohio

[21] Appl. No.: 470,304

[22] Filed: Feb. 28, 1983

[51] Int. Cl.⁴ .................. B60R 19/06; B61G 11/12
[52] U.S. Cl. .................... 293/117; 293/132; 293/134; 293/137; 213/220; 182/89; 182/91; 280/164 R
[58] Field of Search ............... 293/116, 117, 102, 131, 293/132, 134, 135, 137, 123, 146, 2, 4, 5, 115; 280/164 R, 166; 105/443, 446; 182/89, 91, 97; 213/220–223

[56] References Cited

U.S. PATENT DOCUMENTS

| | | | |
|---|---|---|---|
| 868,352 | 10/1907 | Marr | 182/89 |
| 2,544,799 | 3/1951 | McCann | 182/88 |
| 2,660,454 | 11/1953 | Coumerilh | 293/117 |
| 2,890,076 | 6/1959 | Baechler | 293/137 |
| 3,210,110 | 10/1965 | Chieger | 293/118 |
| 3,913,963 | 10/1975 | Persicke | 293/15 |
| 3,923,330 | 12/1975 | Viall, Sr. et al. | 293/117 |
| 4,105,237 | 8/1978 | Viall, Sr. et al. | 293/2 |
| 4,247,138 | 1/1981 | Child | 296/131 |
| 4,266,817 | 5/1981 | Mason et al. | 293/117 |

FOREIGN PATENT DOCUMENTS

| | | | |
|---|---|---|---|
| 1193616 | 6/1970 | United Kingdom | 293/131 |
| 2037932 | 7/1980 | United Kingdom | 293/102 |
| 1587489 | 4/1981 | United Kingdom | 293/131 |
| 2095630 | 10/1982 | United Kingdom | 293/131 |

Primary Examiner—Robert B. Reeves
Assistant Examiner—Dennis H. Pedder
Attorney, Agent, or Firm—Michael Sand Co.

[57] ABSTRACT

A combination bumper and step device adapted to be mounted on the rear of a truck. A pair of horizontally spaced channels are pivotally mounted on the rear of the vehicle frame and extend vertically downwardly therefrom. A pair of vertically spaced horizontally extending steps are rigidly mounted on the spaced channels. A shock absorber is attached to and extends between each of the spaced channels and the truck frame. The steps provide a safe and rigid means for an individual to enter and leave the rear of the truck and the shock absorbers and pivotal mounting of the channels enable the device to move inwardly beneath the truck and absorb a certain amount of impact energy without damaging the device. One of the steps engages the vehicle frame when the device is in a retracted position to provide a positive mechanical stop for the device to prevent damage to the shock absorbers and to prevent any vehicle or other object from running underneath the vehicle body.

3 Claims, 4 Drawing Figures

TRUCK BUMPER AND STEP DEVICE

TECHNICAL FIELD

The invention relates to a device mounted on the rear of a truck which functions both as a bumper and as a series of steps to enable a workman to safely and conveniently enter and leave the cargo carrying area of the truck. More particular the invention relates to such a bumper and step device which is pivotally mounted on the truck frame which absorbs impact energy to prevent damage to the device.

BACKGROUND ART

Due to the height of the body or frame of most cargo carrying delivery type trucks, steps must be provided on the truck frame which are located below the truck body to enable a workman to enter and leave the cargo area in a convenient and safe manner. Certain of these trucks are provided with a rigid frame that is attached to the truck body that extends downwardly therefrom to provide steps for the workman, such as shown in U.S. Pat. Nos. 2,660,454 and 3,858,905. These frames or steps also function as bumpers for the truck when it strikes an object or is struck by another vehicle.

One problem that occurs frequently with such delivery trucks is that the bumper and step portion is often damaged when the truck is backed into a loading dock due to the poor visibility of the dock to the driver or inattention by the driver during the backing procedure. Even though these truck steps and bumper combinations are made of rigid metal, they are subject to bending and breaking when the vehicle backs into a loading dock. This requires the entire unit to be removed from the truck frame and straightened and welded to the vehicle frame or the damaged parts replaced and welded onto the existing frame. All such repairs require time and expense.

There are several prior devices which have been devised in an attempt to overcome the damage problem by providing some type of shock absorbing mechanism whereby the bumper and/or step will pivot or move upon striking an object. Examples of such devices are shown in U.S. Pat. Nos. 2,544,799, 3,210,110, 3,913,963, 3,923,330 and 4,247,138. Although these devices do provide a solution to the problem, they are relatively expensive and require a number of specially designed and constructed parts and only provide a pivotally mounted bumper without providing a series of steps which is desirable to facilitate the loading and unloading of the truck by workmen.

The bumper constructions of U.S. Pat. Nos. 3,913,963 and 4,247,138 are believed to be the closest prior art to the present invention. The bumpers of these patents require a mounting arrangement in which the bumper is mounted on an arm which projects outwardly from the vehicle whereby the bumper is spaced forwardly or rearwardly from the front or rear of the vehicle. The bumper of U.S. Pat. No. 3,913,963 is pivotally mounted on its mounting arm in order for the bumper to displace in a direction having a horizontal component. Such pivotal mounting of the bumper would make it completely unsatisfactory as a step. The bumper of U.S. Pat. No. 4,247,138 uses a bellcrank configuration and a lost motion arrangement for mounting of the bumper bar which also does not function as a step.

There is no known combination truck bumper and step device of which I am aware which provides both the features of the shock absorbing bumper for mounting on the truck in combination with a plurality of rigidly mounted steps for the safety and convenience of a workman when entering and leaving the cargo area.

DISCLOSURE OF THE INVENTION

Objectives of the invention include providing an improved combination truck bumper and step device which is of an extremely simple, inexpensive and rugged construction formed of a minimum number of readily available parts, which parts can be assembled by welding and easily attached to the existing frame of most trucks by drilling several holes in the truck frame for pivotally mounting the device on the frame and for pivotally mounting one end of a pair of shock absorbing members on the frame or hanging bracket. Another object of the invention is to provide such a device in which the step supporting members extend vertically along the side of the truck frame channels a sufficient distance to provide stability in the transverse direction to the improved device as well as rigidly attaching the steps on the supporting members to provide an extremely rigid structure for the safety and convenience of a workman.

It is a further objective of the invention to provide such an improved device in which the shock absorbing means are usual spring-shock absorbers or air-shock absorbers which are standard components readily and inexpensive available from numerous manufacturers. A still further objective is to provide such a device in which a positive mechanical stop is provided to limit the pivotal movement of the steps so that the shock absorbers are not damaged upon excessive pivotal movement of the device in a rearward direction.

Another objective is to provide such a device in which a pair of steps is rigidly attached to a pair of channels which extend vertically downwardly from the truck frame, in which the lowermost step extends horizontally beyond the supporting channels to provide a bumper of sufficient length to protect the vehicle in addition to providing a step for a workman. Another feature of the invention is the mounting of the shock absorbers whereby the length of the shock absorbers in an unstressed at-rest condition is generally equal to the distance between the pivotal connection point of the supporting channels and the pivotal connection point of the shock absorbers on the truck frame.

These objectives and advantages are obtained by the improved combination truck bumper and step device of the type adapted to be mounted on a pair of horizontally spaced frame members of the truck, the general nature of which may be stated as including a pair of horizontally spaced channels adapted to be pivotally mounted on the spaced vehicle frame members and extending generally vertically downwardly from said vehicle frame members and movable between an at-rest position and a retracted position; a pair of vertically spaced step members rigidly attached to and extending horizontally between the pair of spaced channels, the lowermost step of the pair extending horizontally beyond the spaced channels, with the other step of the pair being located between said channels and engageable with the spaced frame members of the truck when the channels are in retracted position providing a positive mechanical stop for the channels when in said retracted position; and a pair of shock absorbing members having first and second ends, said first ends being pivotally attached to the channels closely adjacent the lowermost step of the pair and the second ends being pivotally attached to the vehicle frame members.

BRIEF DESCRIPTION OF DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
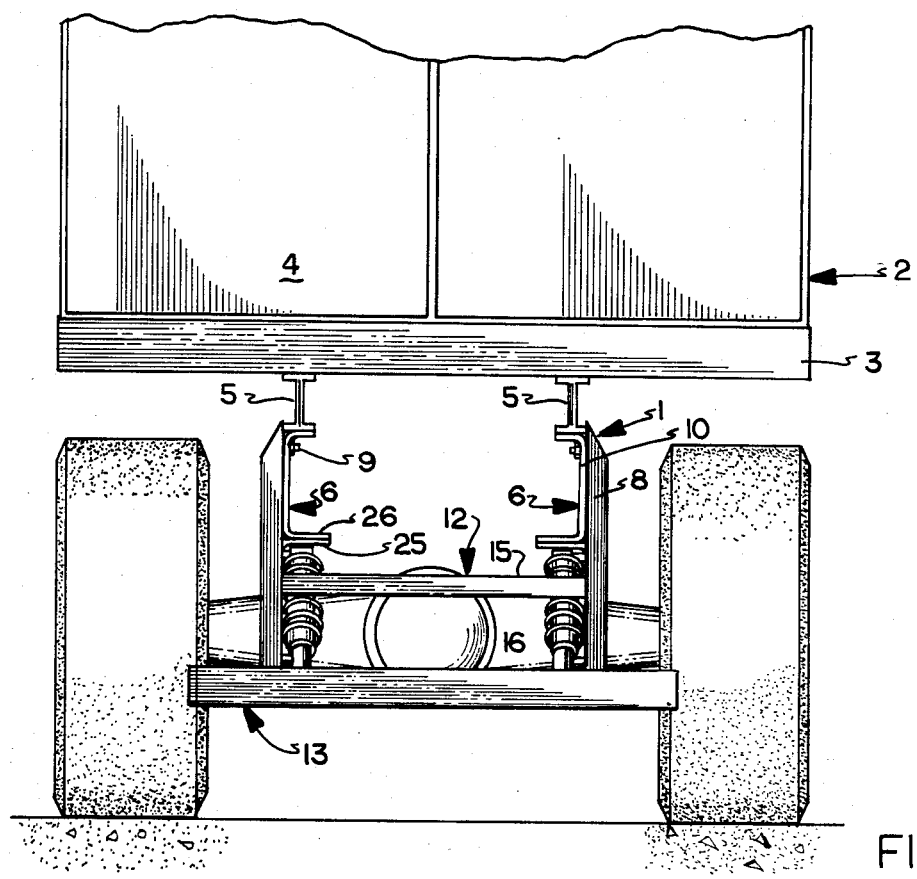
FIG. 1 is a fragmentary generally diagrammatic rear view of a truck having the improved bumper and step device mounted thereon.
Figure 2:
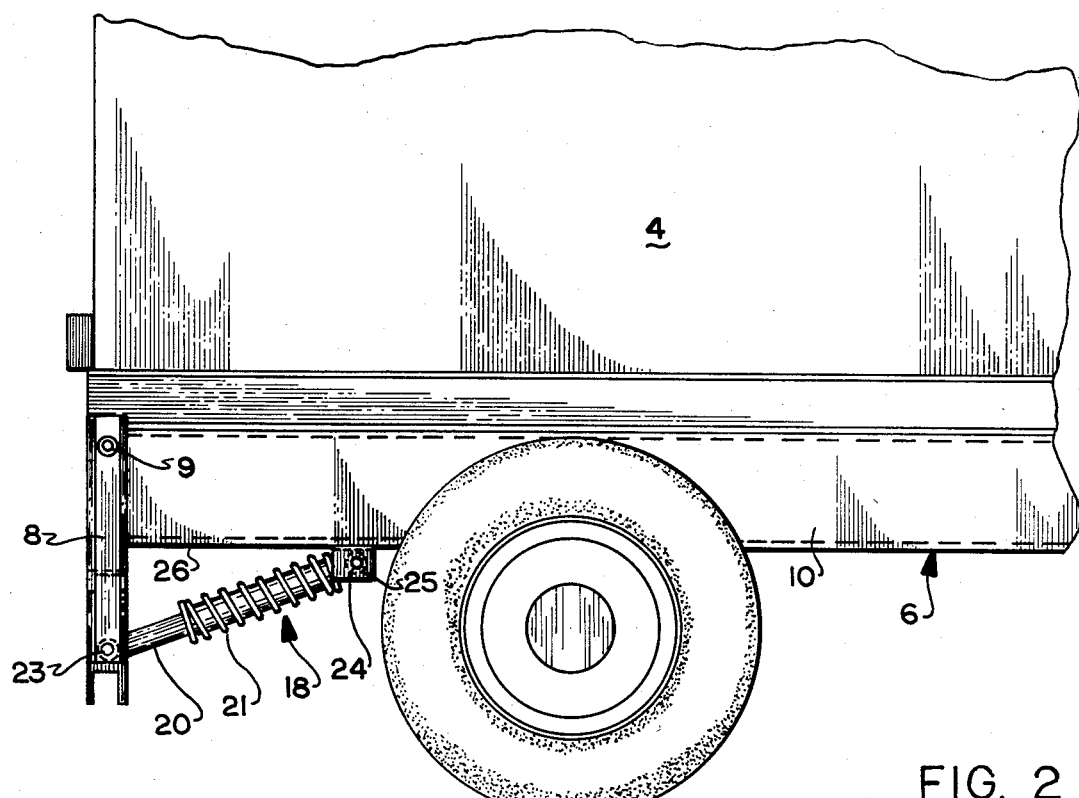
FIG. 2 is a fragmentary generally diagrammatic side elevational view of the improved bumper and step device of FIG. 1 with the bumper shown in an at-rest vertical position.
Figure 3:
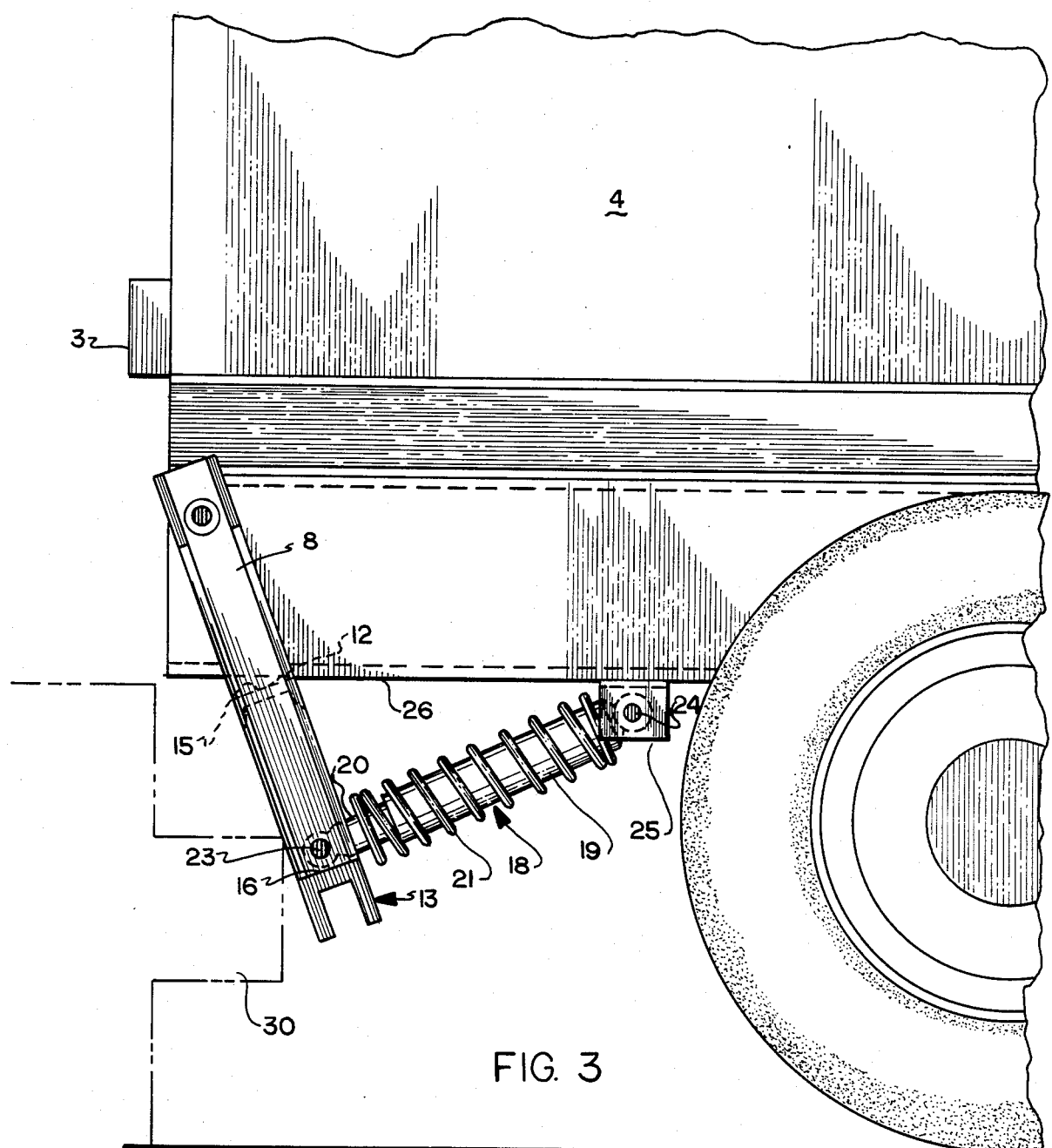
FIG. 3 is an enlarged view similar to FIG. 2 with the bumper and step device engaging a loading dock and shown in retracted position.

The improved bumper and step device is indicated generally at 1, and is shown in FIGS. 1 and 2 mounted on the rear of a truck 2. Device 1 is shown in FIGS. 1 and 2 in its usual at-rest position in which it extends generally vertically downwardly from the rear of truck 2, and is shown in FIG. 3 in a retracted position. Most trucks of the type on which device 1 will be mounted includes a bed or body frame 3 on which a cargo containing portion 4 is mounted by a pair of horizontally spaced I-beams 5. Beams 5 are mounted on a pair of U-shaped truck frame members indicated generally at 6, which extend throughout the longitudinal length of the truck and form the main frame members of the truck body.

Improved device 1 includes a pair of horizontally spaced U-shaped channels 8 which are pivotally mounted by pins 9 on the upper portion of side wall 10 of frame members 6. In a usual at-rest position, channels 8 extend downwardly along the side walls 10 of frame members 6 which provides laterally stability to device 1 reducing considerably any transverse movement of device 1 on frame members 6. A pair of vertically spaced steps indicated generally at 12 and 13, are formed by inverted U-shaped channel members and are rigidly mounted on channels 8 preferably by welding. Step 12 which is referred to as the upper step extends horizontally between channel members 8. Lowermost step 13 is longer than intermediate step 12 and is attached to the bottom ends of channel members 8 and extends beyond the horizontal spacing of channels 8. The top surfaces 15 and 16 of step members 12 and 13 provide relatively wide, smooth and stable surfaces on which an individual can step for entering and leaving the interior of cargo portion 4 of truck 2.

In accordance with another feature of the invention a fluid controlled shock absorbing device indicated generally at 18, is mounted on and extends between each channel 8 and each truck frame member 6. Shock absorbing device 18 is a usual type of shock absorber and may be a spring type as shown in the drawings which consists of a pair of movable telescopically mounted sections 19 and 20 with an energy absorbing spring 21 surrounding the same. Absorber 18 may be of the type sold and distributed by Gabriel Shock Absorber Company of Nashville, Tenn. under its trademark, Rear Load Carrier or could be a pneumatic type of shock absorber also sold and distributed by Gabriel Shock Absorber Company under its trademark Hi-Jacker. One end of each shock absorber 18 is pivotally mounted by a pin 23 to channel 8 closely adjacent step 13 with the other end being pivotally mounted by a pin 24 to a hanging bracket 25. Hanging brackets 25 are welded to bottom walls 26 of U-shaped members 6. Shock absorbers 18 preferably are mounted on truck frame 6 whereby the distance between pivot pins 24 and pivot pins 9 is equal to the length of shock absorbers 18 which is the distance between pivot pins 24 and pivot pins 23 when shock absorbers are in an at-rest or static condition.

The operation of improved bumper and step device 1 is easily seen by viewing FIGS. 2 and 3. Device 1 is shown in FIG. 2 in its normal at-rest position which provides a series of steps to enable a workman to climb into and out of cargo portion 4. Upon device 1 hitting an object or obstruction such as a loading dock 30 as when the truck is being backed into a dock for loading purposes, channels 8 and steps 12 and 13 which form a solid unitary structure, will pivot rearwardly about pins 9 with the impact energy being absorbed by shock absorbers 18. Should the truck continue to move in an excessive distance toward dock 30, intermediate step 12 will abut against bottom wall 26 of truck frame members 6 as shown in FIG. 3 to provide a positive mechanical stop to eliminate damage to the shock absorbers. The stop position of step 12 against frame wall 26 usually will be at the limit of the stroke of shock absorbers 18 and will limit the swing of device 1 to approximately 25°. This limited swing also prevents an automobile from undersliding the rear of the truck upon a rear end collison of the truck and possibly avoiding serious injury to the occupants of the automobile. After the truck moves forward from loading dock 30, device 1 will pivot automatically due to the force of absorber springs 21 and return to its normal at-rest vertical position as shown in FIG. 2.

Figure 4:
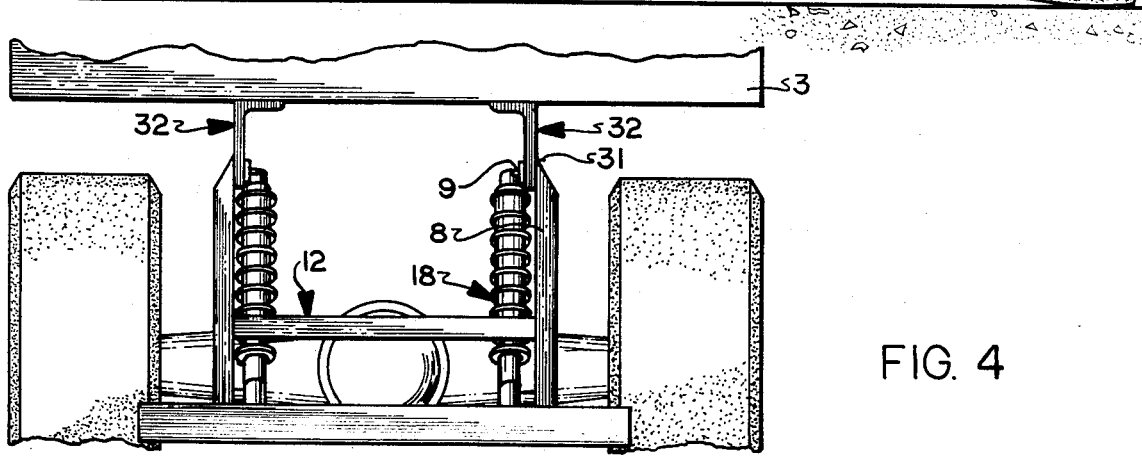
FIG. 4 is a view similar to FIG. 1 showing the improved bumper and step device mounted on a different type of truck frame.

FIG. 4 shows device 1 mounted on a different type of truck frame than that of FIGS. 1 and 2. Channels 8 are mounted by pins 9 on walls 31 of a pair of L-shaped channels 32 which are connected to body frame 3. Channels 32 replace I-beams 5 and frame members 6 of truck 2 of FIGS. 1 and 2. The remaining construction and arrangement of the device in FIG. 4 is similar to that described above for FIGS. 1 and 2 with the upper ends of shock abosrbers 18 being connected by pivot pins 24 to walls 31 of channels 32 spaced from pins 9 a predetermined distance so that channels 8 extend vertically downwardly when the shock absorbers are in a static, noncompressed state.

Improved device 1 has a number of advantages and features. In particular it is an extremely inexpensive device formed by spaced channels 8, steps 12 and 13 and shock absorbers 18, all of which are readily available components which are assembled by usual welding procedures and pin connections. The mounting of device 1 on the upper portion of frame member 6 with channels 8 lying in general proximity to side walls 10 of vehicle frame 6 prevents transverse lateral movement of device 1 thereby providing a rigid structure with a pair of steps for a workman to easily enter and leave the cargo portion 4 of the truck. Furthermore, since both steps are rigidly welded to channels 8, there is no problem of movement of the steps when used by an operator. Also, most of the impact energy that occurs when the rear of the vehicle strikes an object such as a loading dock or in the event that the truck is struck in the rear by a vehicle is absorbed by shock absorbers 18. Furthermore, a positive mechanical stop is provided by engagement of step 12 with bottom frame walls 26 to prevent damage to shock absorbers 18 and to limit retraction of the device to a maximum swing of approximately 25°.

Accordingly, the improved truck bumper and step device is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved truck bumper and step device is constructed and used, the characteristics of the construction, and the advantageous, new and useful results obtained; the new and useful structures, devices, elements, arrangements, parts, and combinations, are set forth in the appended claims.

What is claimed is:

1. An improved combination truck bumper and step device of the type adapted to be mounted on a pair of horizontally spaced frame members of the truck body, said device including:
    (a) a pair of horizontally spaced channels adapted to be pivotally mounted on the spaced vehicle frame members and extending generally vertically downwardly from said vehicle frame members when in an at-rest position and movable between said at-rest position and a retracted position;
    (b) a pair of vertically spaced step members rigidly attached to and extending horizontally between the pair of spaced channels, the lowermost step of the pair extending horizontally beyond the spaced channels, with the other step of the pair being located between said channels and engageable with the spaced frame members of the truck when the channels are in retracted position with said other step providing a positive mechanical stop for the channels when in said retracted position and limiting the movement of said channels to approximately 25°; and
    (c) a pair of fluid controlled shock absorbing members having first and second ends, said first ends being pivotally attached to the channels closely adjacent the lowermost step of the pair and the second ends being adapted to be pivotally attached to the vehicle frame members forward of the pivotal attachment of the channels to the frame member, with said shock absorbing members being placed in compression when the spaced channels move from the at-rest position to the retracted position upon the bumper and step device contacting an object to absorb the contact force therebetween.

2. The device defined in claim 1 in which the distance between the pivotal mounting points of the channels and the pivotal mounting points of the second ends of the shock absorbing members on the truck frame members is generally equal to the length of the shock absorbing members when the channels are in said at-rest position.

3. An improved combination truck bumper and step device of the type adapted to be mounted on the rear end of a pair of horizontally spaced frame members of the truck body, said device including:
    (a) a pair of horizontally spaced channels adapted to be pivotally mounted on the rear end of spaced vehicle frame members and extending generally vertically downwardly from said vehicle frame members when in an at-rest position and movable between said at-rest position and a retracted position;
    (b) first and second vertically spaced step members rigidly attached to and extending horizontally between the pair of spaced channels, said first step being located at the lower end of the spaced channels, and said second step being located intermediate said first step and the pivotal attachment of the channels and engageable with the spaced frame members of the truck when the channels are in retracted position with said other step providing a positive mechanical stop for the channels when in said retracted position and limiting the movement of said channels to approximately 25°; and
    (c) a pair of fluid controlled shock absorbing members having first and second ends, said first ends being pivotally attached to the channels closely adjacent the lowermost step of the pair and the second ends being adapted to be pivotally attached to the vehicle frame members forward of the pivotal attachment of the first ends, with said shock absorbing members being placed in compression when the spaced channels move from the at-rest position to the retracted position upon the bumper and step device contacting an object to absorb the contact force therebetween.

* * * * *